(12) United States Patent
Berg

(10) Patent No.: US 7,324,406 B2
(45) Date of Patent: Jan. 29, 2008

(54) SENSOR ARRANGEMENT FOR SEISMIC WAVES

(75) Inventor: Eivind Berg, Trondheim (NO)

(73) Assignee: Sea Bed Geophysical AS, Trondheim (NO)

( * ) Notice: Subject to any disclaimer, the term of this patent is extended or adjusted under 35 U.S.C. 154(b) by 0 days.

(21) Appl. No.: 10/501,128

(22) PCT Filed: Dec. 9, 2003

(86) PCT No.: PCT/NO03/00408

§ 371 (c)(1),
(2), (4) Date: Oct. 14, 2004

(87) PCT Pub. No.: WO2004/053526

PCT Pub. Date: Jun. 24, 2004

(65) Prior Publication Data

US 2005/0105391 A1    May 19, 2005

(30) Foreign Application Priority Data

Dec. 9, 2002    (NO) ................................. 20025896

(51) Int. Cl.
*G01V 1/38* (2006.01)
*G01V 1/16* (2006.01)
*G01V 1/28* (2006.01)

(52) U.S. Cl. .................. 367/15; 367/141; 367/188; 181/120

(58) Field of Classification Search .............. 367/15, 367/149, 157, 159; 181/110, 120
See application file for complete search history.

(56) References Cited

U.S. PATENT DOCUMENTS

| | | | |
|---|---|---|---|
| 2,657,374 A * | 10/1953 | Bardeen | ..................... 367/182 |
| 3,332,057 A * | 7/1967 | Pavey, Jr. | .................... 367/159 |
| 4,134,097 A | 1/1979 | Cowles | |
| 4,163,206 A * | 7/1979 | Hall, Jr. | ..................... 367/160 |
| 4,300,220 A | 11/1981 | Goff et al. | |
| 4,692,906 A * | 9/1987 | Neeley | ........................ 367/15 |
| 4,870,625 A | 9/1989 | Young | |
| 5,189,642 A * | 2/1993 | Donoho et al. | ............... 367/15 |
| 5,253,223 A | 10/1993 | Svenning et al. | |

(Continued)

FOREIGN PATENT DOCUMENTS

WO    WO 9106879 A1    5/1991
WO    WO0151954    *    7/2001

OTHER PUBLICATIONS

Cladwell, Jack. "Marine Multicomponent seismology." The Leading Edge, Nov. 1999.*

(Continued)

*Primary Examiner*—Jack Keith
*Assistant Examiner*—Scott A Hughes
(74) *Attorney, Agent, or Firm*—Brouse McDowell; Timothy D. Bennett

(57) ABSTRACT

A sensor arrangement is provided for use in the seismic investigation of geological formations below the seabed. A plurality of sensor nodes (20) are provided and are positioned gfor deployment on the seabed to collect pressure waves and shear waves from the geological formations and to transfer seismic data to a surface receiver. Each sensor node (20) may include a cylindrical structure (22), which is intended to penetrate downwardly into the seabed. At least one, preferably three, geophones (30-32) are positioned in connection with this structure (22). An advantageous method for operating a seismic mapping system with sensor arrangements orderly deployed on the seabed records data concerning system behavior and seismic data. This data may be further processed separately.

14 Claims, 2 Drawing Sheets

U.S. PATENT DOCUMENTS

| | | | |
|---|---|---|---|
| 5,442,590 A * | 8/1995 | Svenning et al. | 367/15 |
| 5,724,241 A | 3/1998 | Wood et al. | |
| 5,774,421 A * | 6/1998 | Vincent et al. | 367/131 |
| 5,803,668 A * | 9/1998 | Seki et al. | 405/204 |
| 5,920,524 A * | 7/1999 | Stein et al. | 367/188 |
| 6,353,577 B1 * | 3/2002 | Orban et al. | 367/43 |
| 6,474,254 B1 | 11/2002 | Ambs et al. | |
| 6,625,083 B2 * | 9/2003 | Vandenbroucke | 367/15 |
| 6,657,921 B1 * | 12/2003 | Ambs | 367/20 |
| 6,813,564 B2 * | 11/2004 | Eiken et al. | 702/5 |
| 6,814,179 B2 * | 11/2004 | Corrigan et al. | 181/112 |
| 2002/0110048 A1 | 8/2002 | Vandenbroucke | |

OTHER PUBLICATIONS

Grant, et al. 3D×4C Seafloor Survey with Node Technology: A Case history from the Guillemot field. CGG, posted Jul. 18, 2001.*

Suarez, Carlos Rodriguez. "Advanced Marine Seismic Methods: Ocean-bottom and Vertical Cable Analyses." CREWES Feb. 2000.*

Vuillermoz, Claude. "Multicomponent seismic enhances characterization of offshore reservoirs." World Oil, Apr. 1998.*

* cited by examiner

SENSOR ARRANGEMENT FOR SEISMIC WAVES

This application claims priority from PCT patent application PCT/NO03/00408 with an International filing date of Dec. 8, 2003, which claims priority from Norwegian Patent Application No. 20025896, filed Dec. 9, 2002.

I. BACKGROUND OF THE INVENTION

A. Field of Invention

The invention relates to a sensor arrangement for receiving seismic waves that are reflected from geological formations below the seabed. A plurality of sensor nodes is placed on the seabed preferably in an orderly manner. In addition, the invention comprises a method of managing a seismic mapping system.

B. Description of the Related Art

For sensing seismic pressure waves, and shear waves in particular, the sensor nodes must, in principle, be in contact with a solid medium. In a marine offshore environment, this implies collecting this kind of data on the seabed, in contact with the subsea sediments. In this context, shear waves or converted seismic waves have other characteristics for describing formations and hydrocarbon reservoirs, than the traditional pressure waves alone. In a marine context, pressure waves are traditionally collected by using hydrophone sensor cables that are towed behind a vessel that also expels regular pressure pulses form air guns.

In a marine context, shear waves and converted shear waves are usually obtained by generating pressure waves with a pressure pulse from air guns at a surface vessel. When such pressure waves strike the seabed and the various geological interfaces in geological formations below the seabed, some of the pressure wave energy will transform into reflecting shear wave energy or converted shear waves, which are absorbed in sensor nodes that are deployed down into the seabed. Since water dos not have shearing strength, it cannot carry shear waves, as can solids.

To obtain mapping value of the geological formations, the sensor nodes must be placed in organized matrix patterns in large numbers on the seabed, so that the reflected pressure waves and converted shear waves together can contribute to an accurate image of the geological seabed formations. In this context, an image signifies a geometric three-dimensional representation, which gives information on petrophysical characteristics of geological reservoir formations and the fluid content of these.

Of known systems, there are mainly two types; so-called "OBS" or individual seabed seismometers and multiple component seabed cables. OBS-units are dropped from the surface and sink freely down onto the seabed. The geophones are placed on the inside of a glass ball, while the hydrophone is placed on the outside. A release mechanism makes the glass balls with geophones, hydrophone, collection electronics and collected data float up to the surface, where they are collected. An iron frame platform is left on the seabed. OBS is used for rough geological mapping base don seismic refraction.

Multiple component seabed cables normally comprise three-component geophones with gimbal suspension and hydrophones lying inside and along a cable, or in windings of a cable. The cables are laid or rolled down on the seabed by dynamically positioned vessels on the surface, but in some cases they can be pulled along the seabed. The collection of pressure and shear wave reflection data occurs with the same method as with surface cables.

II. SUMMARY OF THE INVENTION

The main object of the invention is to provide a sensor arrangement that combines the demands for reliable and detailed registrations, i.e., absorption of reflected seismic waves of an area, with the request for equipment that is easy to place on the seabed.

Another object is to provide a sensor arrangement with a sensor element that can be lowered into the sediments on the seabed and that is unaffected by a support and control unit, while ensuring directional sensitivity independent of the position. The sensor arrangement should be small, compact and light.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DESCRIPTION OF THE PREFERRED EMBODIMENT

Figure 1:
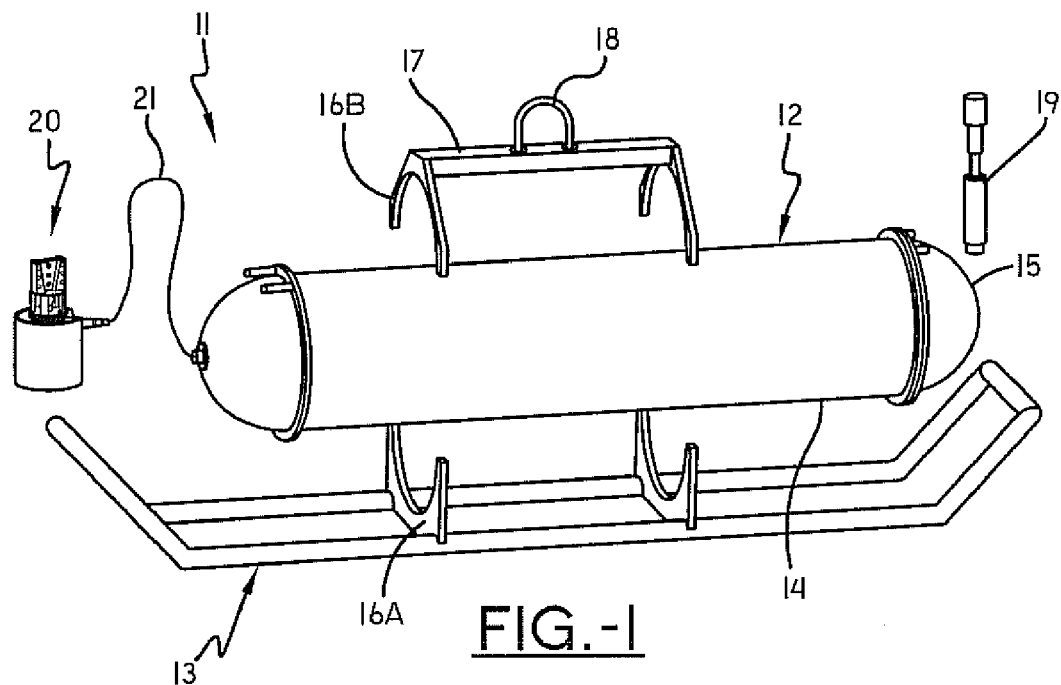
FIG. 1 is an exploded perspective view of a sensor arrangement according to the invention, with a sensor node in connection with a control unit.

Referring now to the drawings wherein the showings are for purposes of illustrating a preferred embodiment of the invention only and not for purposes of limiting the same, FIG. 1 shows a control unit 11 with a cigar-shaped housing 12 placed onto a pair of runners 13 with a bend in both ends. The cigar-shaped housing 12 has a cylindrical central part 14 with end flanges, and two hemispherical shaped end-domes 15 attached to the end flanges. The housing 12 is attached to two opposed, divided supports 16A and 16B, which on the upper side are joined with a rail 17 that holds a gripping bow 18. With this gripping bow, the control unit 11 can be lowered down onto the seabed at defined positions. This will be described below.

The control unit 11 contains a computer with a storage medium, clock, telemetry system and batteries. It makes continuous recording of seismic data with a given sampling frequency possible. Hydroacoustic communication makes it possible to collect control data from saved seismic data on a hard disk, at discreet points in time. Only data chosen in advance is recorded y telemetry, and this data consist of two types: 1) system data and 2) seismic data, which are processed further. System data can be information about battery status, data storage volume and tiltmeter data. While cable connection has limited capacity for data transmission and quality control, the transmission capacity is now limited and the need for good methods and routines for quality control has increased.

FIG. 1 also shows a sensor node 20 that is connected to the control unit 11 with an acoustic insulated cable 21, i.e., a cable that cannot transfer mechanical vibrations. The sensor node 20 can be carried together with this during the deployment, as will be described below. In FIG. 1, a transducer 19 is also shown and is used for transmission of data.

Figure 2:
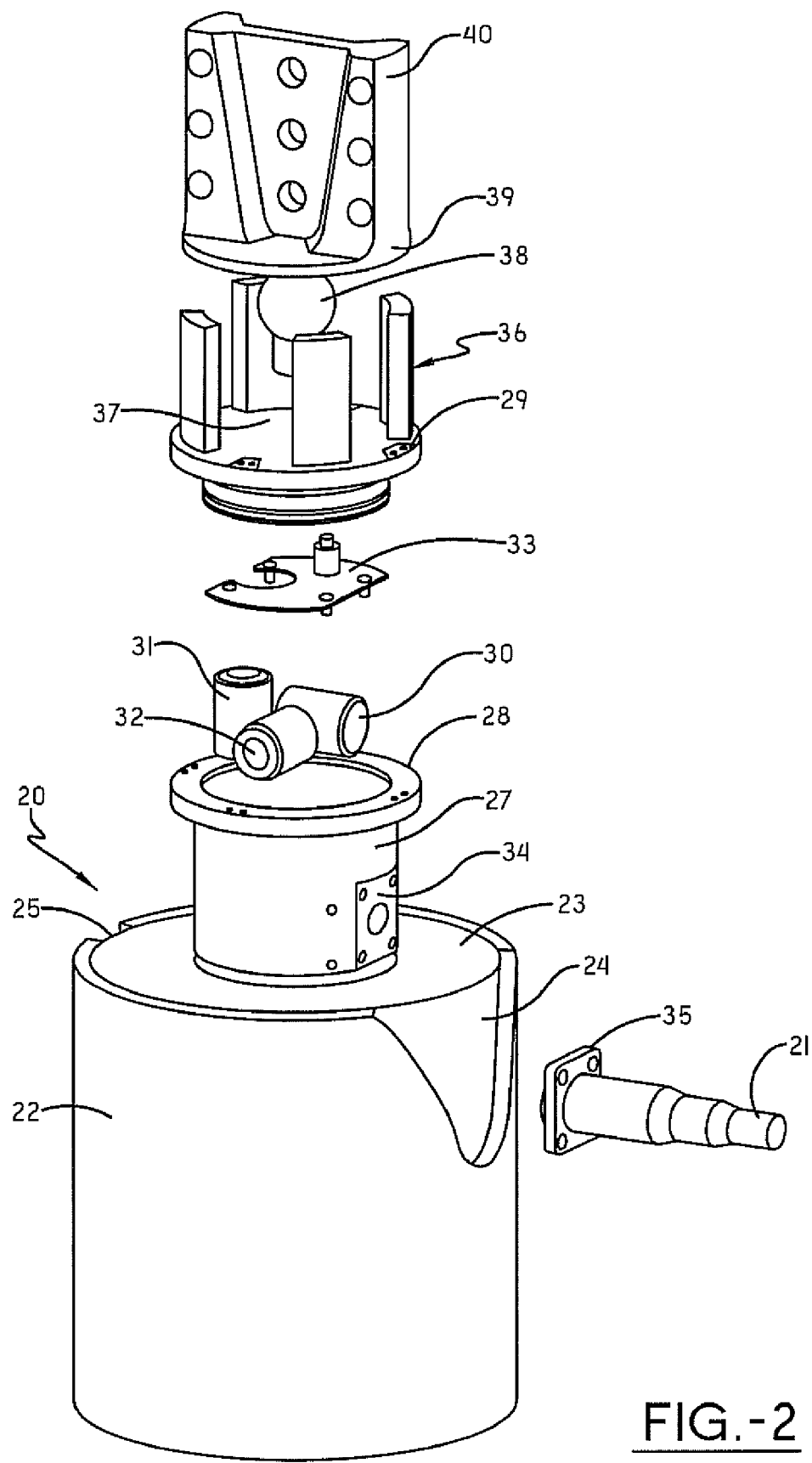
FIG. 2 is an exploded perspective view of an embodiment of a sensor node.

FIG. 2 shows a more detailed example of a sensor node 20 that provides a sensor system. The sensor node 20 includes a lower main part or skirt, a geophone housing with three geophones, a tiltmeter that measures angle in relation to the coordinates X and Y, a hydrophone and a grip element for a remotely operated vehicle (ROV). These parts will be described below in more detail.

The lower main part comprises a cylindrical skirt 22 that at its upper part is terminated with a plate ring 23 that is fixed, for instance by welding, so that it has the shape of an inverted bucket with an opening in the bottom. A skirt 22 with a shape that deviates from an ideal cylindrical shape, for instance a multiangular and/or slightly tapered shape, can also be used.

The skirt 22 in the example is cylinder shaped for being direction insensitive with regard to seismic waves, and simultaneously for achieving a good coupling to the seabed sediments. Because of the thin walls of the skirt 22, the skirt will cause small mass movement, but simultaneously have a large contact area against the sediments on both sides (inside and outside). The skirt can advantageously be formed of aluminum for achieving optimal contact/binding. Aluminum binds well to clay minerals in the sediments.

The diameter and the length of the skirt can be of the same dimension for instance 200 millimeters ("mm"), with a wall thickness of 5 mm. A V-shaped outlet 24 is made in the upper edge of the skirt 22, partly for giving space to the cable 19 and partly for letting out sediments and water when deploying. On the diametrically opposed side, there is a notch 25 in the edge of the skirt 22 for ensuring sediment discharge.

In the upper part of the cylindrical shaped skirt 22, and attached to the plate ring 23, there is placed a geophone housing 27 of cylindrical shape and an upper flange 28 for a cover 29. In the geophone housing 27 there are placed three component-geophones 30, 31, 32, which are positioned with a 90° angle in relation to each other, and a coupling card 33 with electric components and couplings. The geophone housing 27 has an attachment plate 34 for the cable connection 35 with an opening for the cable 21.

On the cover 29, four upwardly projecting poles 36 are evenly distributed at the outer edge and define a cage 37 for a hydrophone 38. The hydrophone 38 measures pressure changes right above the geophone housing 27, for instance 10-15 centimeters ("cm") above the seabed, in pure water zone. It does not have sediments surrounding it.

A plate 39 is mounted above the poles 36 and carries an upward projecting grip 40 for a gripping tool on a ROV. The sensor node 20 can in this way be deployed from a remotely controlled vehicle with a general arm or by making a special deployment tool (ROT) for deploying the sensor node. This is in particular relevant in shallow waters, with a depth of some tens of meters.

The skirt 22 is lowered into the seabed sediments so that the lower part of the geophone housing 27 has a good connection to the surrounding sediments. The skirt 22 ensures a minimal change in the sediment characteristics, as little sediment mass is relocated during deployment. This makes the skirt-design suited to both a hard and a soft seabed. The coupling of the skirt 22 to the upper 10-50 cm of the seabed sediments represents the geophone coupling to the sediments just below the seabed. The skirt is lowered down to the lower part of the geophone housing if the seabed is hard, or down to the upper part of the skirt if the seabed is softer (upper edge of the skirt).

The sensor nodes 20 are then deployed as vertically as possible (less than 5 degrees off vertical). The direction/heading (compass direction) in relation to north is measured from the ROV. This makes it possible to conduct a full rotation in relation to measured data. This is much more accurate.

Under extreme conditions with considerable current on the seabed, the control unit can be provided with extra weights and spikes that extend into the seabed so that it is held in position. (Experience with the aforementioned is in 4 knots current at a river mouth).

For large water depths towards 2000-3000 meters ("m"), the control unit 11 must be modified for such depths. The rest of the sensor node 20 can remain the same.

Figure 3:
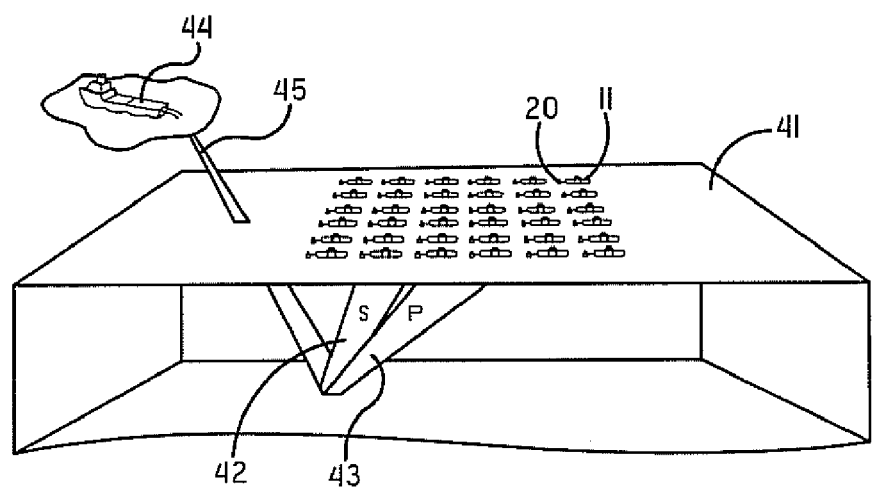
FIG. 3 is schematic perspective view that illustrates the placing of a number of sensor nodes in a squared pattern and how a wave generated from the surface is reflected towards a node from a geological formation below the seabed.

FIG. 3 shows an example of an arrangement with several sensors in a matrix pattern on the seabed 41 where each sensor node 20 is connected to its own control unit 11. In this way, it is possible to map the pressure wave reflections 42 and the shear wave reflections 43 in a sheet pattern. On the basis of this data, with appropriate signal processing, one can draw conclusions about the geological formations below the seabed including the fluid content among other things. A typical distance between the sensor nodes 20 can be 300-500 m. Numeral 44 indicates a vessel that generates seismic waves 45.

The sensor node 20 may be small, compact, and light weight. Its specific weight may be the same or less than the specific weight of the sediments in which it is deployed. The size and shape of the skirt can be adapted to various seabed conditions. The skirt 22 and the grip 40 of the ROV are modular and can easily be replaced with corresponding parts with different size and shape. Manufacturing the skirt in aluminum yields particularly good contact to the sediments in the seabed.

When the sediments are hard, the shape of the skirt 22 can be altered by reducing the skirt length and increasing its diameter, to achieve the best possible coupling. When the bottom is rough or particularly hard, the lower part of the skirt may have teeth to achieve a better contact to the seabed sediments, where appropriate.

For soft seabed sediments, it is appropriate to increase the skirt's diameter and possibly also its length, to achieve the best possible coupling. In any case, the sensor nodes 20 shall have the lowest possible center of gravity, i.e., the center of gravity is preferably on the seabed or more preferably, below the seabed level. The weight of the sediments inside the skirt is included when determining the center of gravity. The shape of the skirt ensures a stable coupling of the sensor node to the seabed, even with some lateral variation of the sediments along the bottom.

As an alternative to the skirt 22 of plate material, a ring layout of poles, with or without spaces, can be used.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A sensor arrangement for use in seismic investigation of geological formations below the seabed comprising:

a plurality of sensor nodes (20), which are positioned for deployment on the seabed to acquire pressure waves and shear waves from the geological formations and to transfer seismic data to a surface receiver, wherein each sensor node (20):

(a) comprises a substantially cylindrical skirt (22) having a bottom with an opening, the bottom adapted to penetrate into the seabed;

(b) comprises a housing (27) that encloses at least a first geophone (30) and that is positioned at the top of the cylindrical skirt (22); and, (c) is connected to a control unit (11) through an acoustic insulated cable (21), wherein the cable (21) is received into the sensor node (20) through an outlet formed in the upper part of the skirt (22), wherein the outlet discharges sediment when the sensor node is deployed.

2. A sensor arrangement according to claim 1, further comprising an open cage (37) that encloses at least a first hydrophone (38) and is positioned above the housing (27).

3. A sensor arrangement according to claim 1, further comprising a grip (40) that is fixed at the top for use with a ROV ROT.

4. A sensor arrangement according to claim 1, wherein each cylindrical skirt is manufactured of aluminum.

5. A sensor arrangement according to claim 1, wherein a hydrophone (38) is placed about 10 cm above the geophone (30).

6. A sensor arrangement according to claim 1, wherein the housing (27) encloses three geophones (30-32) that are positioned with a 90° angle in relation to each other, and a tiltmeter.

7. A sensor arrangement for use in seismic investigation of geological formations below the seabed comprising:

a plurality of sensor nodes (20) that are positioned for deployment on the seabed to acquire pressure waves and shear waves from the geological formations and to transfer seismic data to a surface receiver, each sensor node (20) comprises:

(a) a substantially cylindrical skirt (22) having a top and a bottom, the bottom has an opening and penetrates into the seabed, the skirt also has a pair of outlets (24, 25) that discharge sediment when the sensor node is deployed;

(b) a plate (23) attached to the top of the skirt (22);

(c) a geophone housing (27) for holding at least a first geophone (30), the geophone housing (27) extends below the plate (23) and into the opening in the skirt (22) and comprises an upper portion (28) attached to the plate (23);

(d) a hydrophone cage (37) for holding a hydrophone (38), the hydrophone cage (37) is positioned above the plate (23) and comprises a cover (29) that attaches to the upper portion (28) of the geophone housing (27) and a plurality of poles (36) extending upward from the cover (29);

(e) a grip (40) that is gripped by a gripping tool on a ROV, the grip is attached to a plate (39) that is attached to tops of the poles (36);

(f) an acoustic insulated cable (21) having a first end connected to an associated control unit (11) and a second end connected to the geophone housing (27) below the plate (23), the cable is received through one of the outlets (24, 25).

8. A sensor arrangement according to claim 7, wherein the geophone housing (27) encloses three geophones (30-32) that are positioned with a 90° angle in relation to each other, and a tiltmeter.

9. A sensor arrangement according to claim 8, wherein the geophone housing (27) further comprises a coupling card (33).

10. A sensor arrangement according to claim 8, wherein the geophone housing (27) further comprises an attachment plate (34) that attaches to a cable connection (35) of the cable (21).

11. A sensor arrangement according to claim 8, wherein the geophone housing (27) is substantially cylindrical and the upper portion (28) of the geophone housing (27) comprises a flange.

12. A sensor arrangement according to claim 8, wherein the cylindrical skirt is manufactured of aluminum.

13. A sensor arrangement according to claim 8, wherein the hydrophone (38) is positioned about 10 cm above at least one of the geophones (30-32).

14. A sensor arrangement according to claim 8, wherein the bottom of the skirt (22) comprises teeth to achieve better contact with the seabed sediments.

* * * * *